United States Patent
Maniero et al.

(10) Patent No.: US 12,540,767 B2
(45) Date of Patent: Feb. 3, 2026

(54) REFRIGERATION PLANT AND METHOD FOR PREVENTING OVERHEATING BY TEMPERATURE-BASED CONTROL

(71) Applicant: CAREL INDUSTRIES S.p.A., Brugine (IT)

(72) Inventors: Alessandro Maniero, Brugine (IT); Matteo Miotto, Brugine (IT)

(73) Assignee: CAREL INDUSTRIES S.P.A., Brugine (IT)

( * ) Notice: Subject to any disclaimer, the term of this patent is extended or adjusted under 35 U.S.C. 154(b) by 263 days.

(21) Appl. No.: 18/365,480

(22) Filed: Aug. 4, 2023

(65) Prior Publication Data

US 2024/0044564 A1 Feb. 8, 2024

(30) Foreign Application Priority Data

Aug. 5, 2022 (IT) .................. 102022000016839

(51) Int. Cl.
*F25B 49/02* (2006.01)
*F25B 5/02* (2006.01)

(52) U.S. Cl.
CPC .......... *F25B 49/022* (2013.01); *F25B 5/02* (2013.01); *F25B 2500/16* (2013.01); *F25B 2600/0253* (2013.01); *F25B 2700/21151* (2013.01); *F25B 2700/21175* (2013.01)

(58) Field of Classification Search
None
See application file for complete search history.

(56) References Cited

U.S. PATENT DOCUMENTS

2018/0283753 A1* 10/2018 Das .................. F25B 31/002
2019/0137156 A1* 5/2019 Popli .................. F25B 1/10

FOREIGN PATENT DOCUMENTS

| EP | 3094167 A1 | | 11/2016 |
| EP | 3388760 A1 | | 10/2018 |
| EP | 3825630 A1 | | 5/2021 |
| JP | 2010261715 A | * | 11/2010 |
| WO | 2006126396 A1 | | 11/2006 |

OTHER PUBLICATIONS

Search Report dated Mar. 28, 2023 from Italian Application No. IT 202200016839.

* cited by examiner

*Primary Examiner* — Jerry-Daryl Fletcher
*Assistant Examiner* — Daniel C Comings
(74) *Attorney, Agent, or Firm* — INNOVATION CAPITAL LAW GROUP, LLP; Vic Lin

(57) ABSTRACT

A method of operating a refrigeration plant which comprises sensing means designed to detect or derive an overheating temperature Tsh at an intake of a compressor assembly of the refrigeration plant. The method comprises: a standard operating mode A that sets an optimal value Ropt, for the operating regime of the compressor Rcomp(t); a mode B, which verifies, whether the overheating temperature Tsh exceeds a threshold value Max, to verify whether the operating regime Rcomp(t) of the compressor assembly is greater than a safety value Mpd and, in the case of a positive outcome, to limit the operating regime Rcomp(t) of the compressor assembly to a safety value Mpd, setting the optimal value Ropt, overriding mode A.

19 Claims, 4 Drawing Sheets

REFRIGERATION PLANT AND METHOD FOR PREVENTING OVERHEATING BY TEMPERATURE-BASED CONTROL

TECHNICAL FIELD

This invention relates to a refrigeration plant, especially a multi-evaporator system, and an operating method thereof.

BACKGROUND ART

Currently, in the field of refrigeration plants, particularly if of the multi-evaporator type, the problem of guaranteeing the return of the lubrication oil to the latter is known.

Such refrigeration plants may be provided with a plurality of evaporator assemblies, each installed in a peripheral unit.

Each evaporator assembly is served by a centralised condenser assembly provided with a compressor assembly and an expander assembly.

The lubricating oil is present in the refrigerating circuit itself and is drawn by the latter during operation.

The oil intended for lubrication of the compressor assembly is therefore drawn by the cooling fluid through the system and due to the distance of the peripheral units from the condenser assembly, as well as in particular operating conditions of the system, a real risk may arise that the compressor assembly is not fed by a quantity of lubricant adequate for its rotation regime.

In other words, for example at the initial start-up of the plant or in other conditions in which the refrigerating fluid is relatively hot, and therefore, mostly gaseous, and the oil is dispersed to the refrigerating circuit, there may not be an adequate quantity present in the compressor.

In the working condition known as "pull down", in which a rapid lowering of the temperature is required to the peripheral units, the plant control system is programmed to operate the compressor at the maximum speed of the latter.

In situations such as the first start-up of the system or following a succession of evaporator defrosting events, however, the compressor assembly may be subject to a situation of high stress due to the simultaneous occurrence of the following situations:
    the cooling fluid is at a relatively high temperature, that is, in which it is in a gaseous state and, therefore, with a poor lubricating fluid drawing capacity;
    the compressor assembly operates at a high speed thus quickly discharging the lubricant it sucks in.

According to this scenario, the compressor assembly risks being fed by an insufficient amount of lubricant in the face of a corresponding high discharge flow rate.

Currently, in order to avoid such stressful situations it is known to provide, downstream of the compressor, an oil separator that is designed to separate the lubricant from the cooling fluid discharged from the compressor and reintroduce it to the intake of the compressor itself, thus preventing the lubricant from being drawn through the entire refrigeration plant.

SUMMARY OF THE INVENTION

This traditional solution clearly complicates the system and therefore makes it more expensive to manufacture, less compact and, in general, more sensitive to malfunctions and requiring greater maintenance.

The task of a multi-evaporator refrigeration plant and operating method thereof, according to the invention, is therefore to solve this problem.

Within this task, an aim of the invention is to propose a multi-evaporator refrigeration plant and an operating method thereof that allows overheating conditions of the compressor to be prevented or, in any case, mechanical stress of the latter, in particular during pull down phases.

Within this task, an aim of the invention is to provide a refrigeration plant and an operating method thereof that allows the use of lubricant/coolant separators to be avoided while ensuring an adequate safety of operation of the compressor, a long service life and without determining significant increases in maintenance of the system under the same workloads.

This task, as well as these and other aims which will emerge more fully below, are achieved by a refrigeration plant and relative method of operation according to the appended independent claims.

Detailed features of a multi-evaporator refrigeration plant and an operating method thereof according to the invention are indicated in the dependent claims.

Further features and advantages of the invention will emerge more fully from the description of a preferred but not exclusive embodiment of a multi-evaporator refrigeration plant and an operating method thereof according to the invention, illustrated by way of non-limiting example in the accompanying drawings.

DETAILED DESCRIPTION

Figure 1:
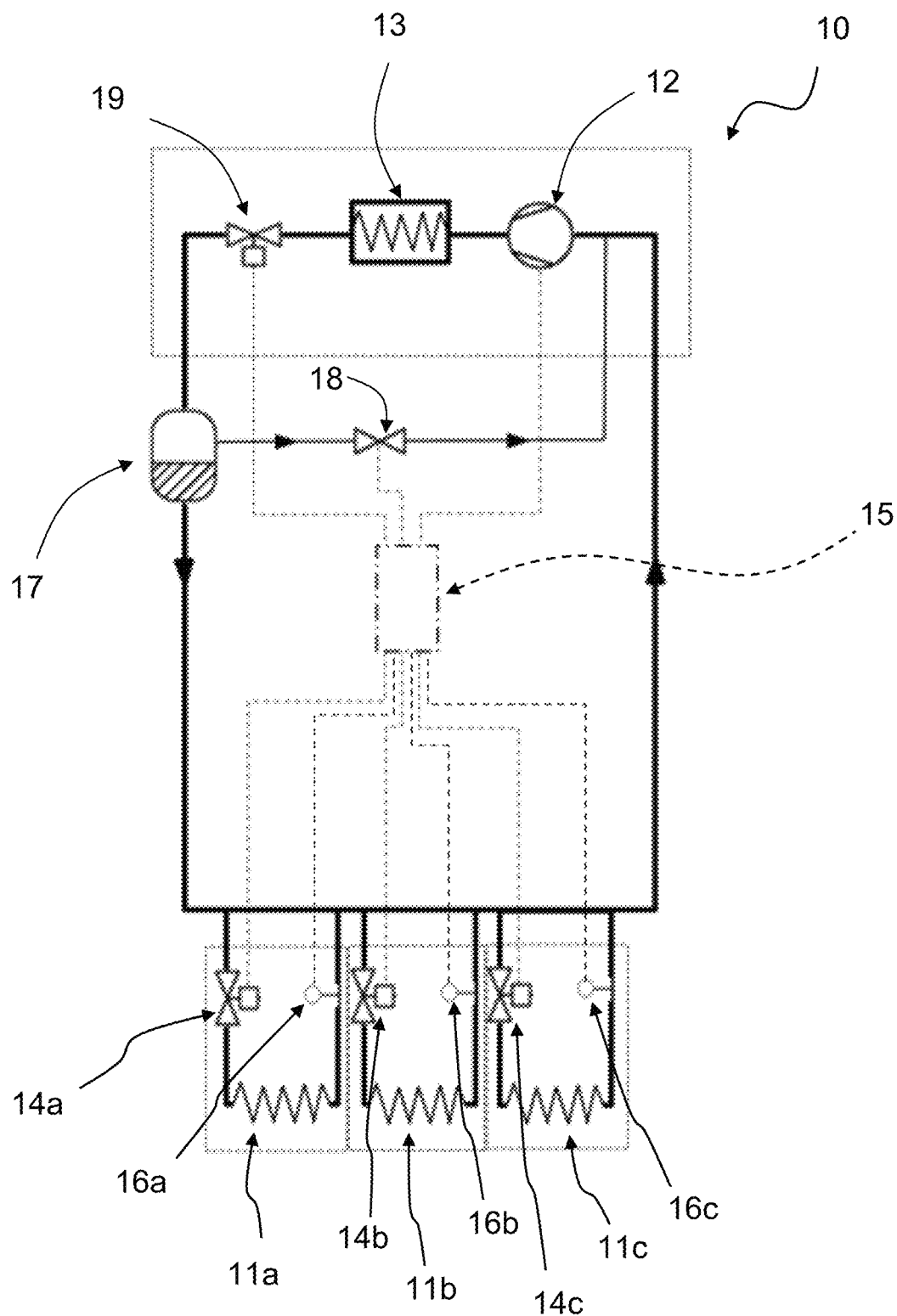
FIG. 1 is a schematic view of a multi-evaporator refrigeration plant according to the invention.
Figure 2:
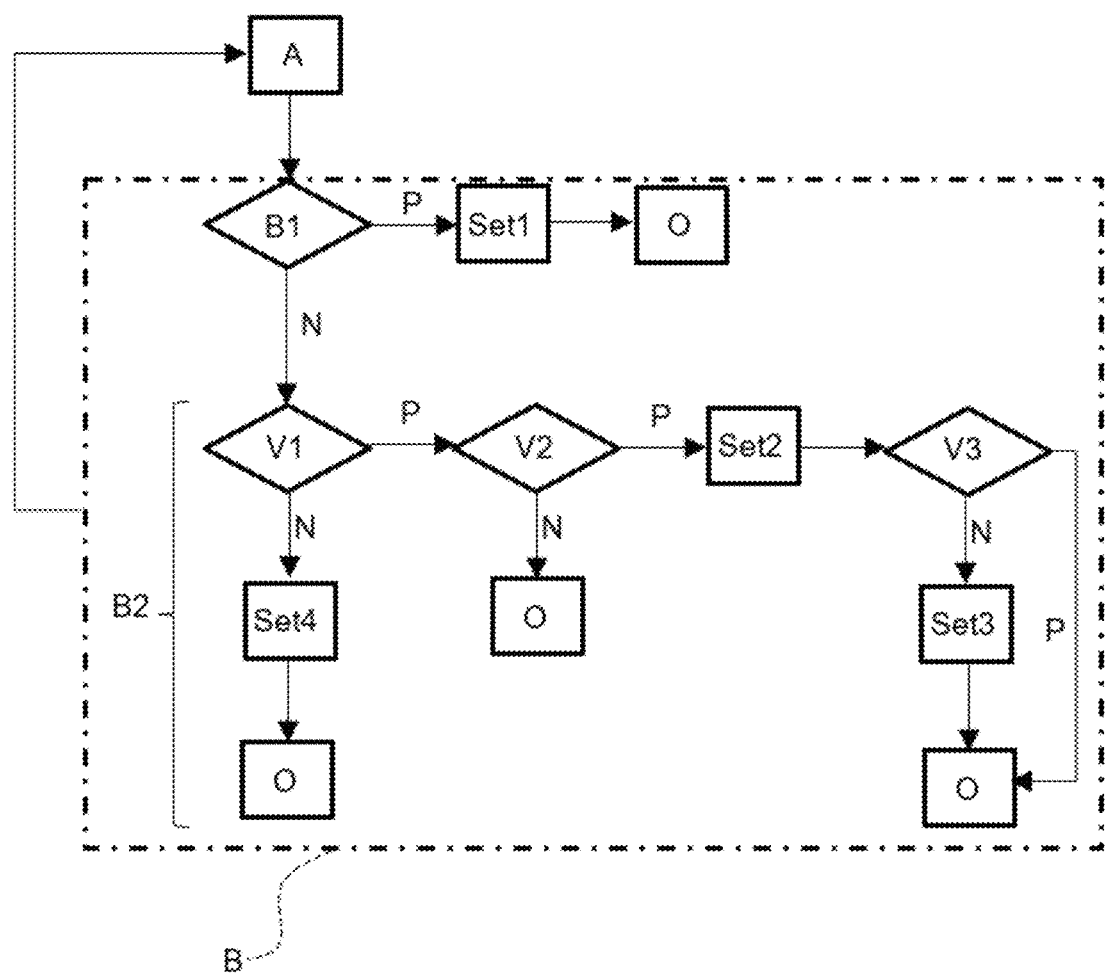
FIG. 2 is a schematic view of an operating method of a refrigeration plant according to the invention.
Figure 3:
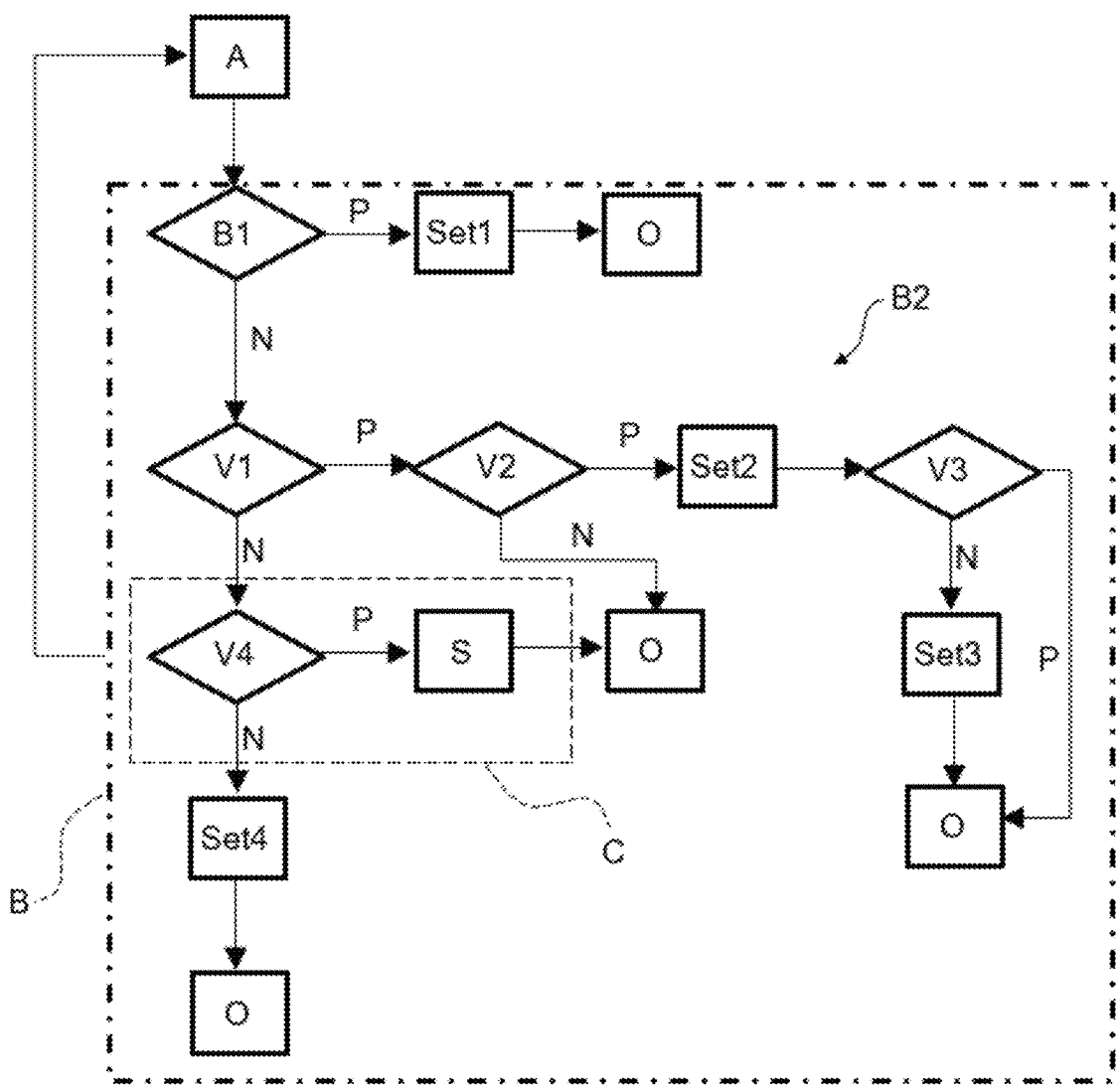
FIG. 3 is a schematic view of a variant of an operating method of a refrigeration plant according to the invention.
Figure 4:
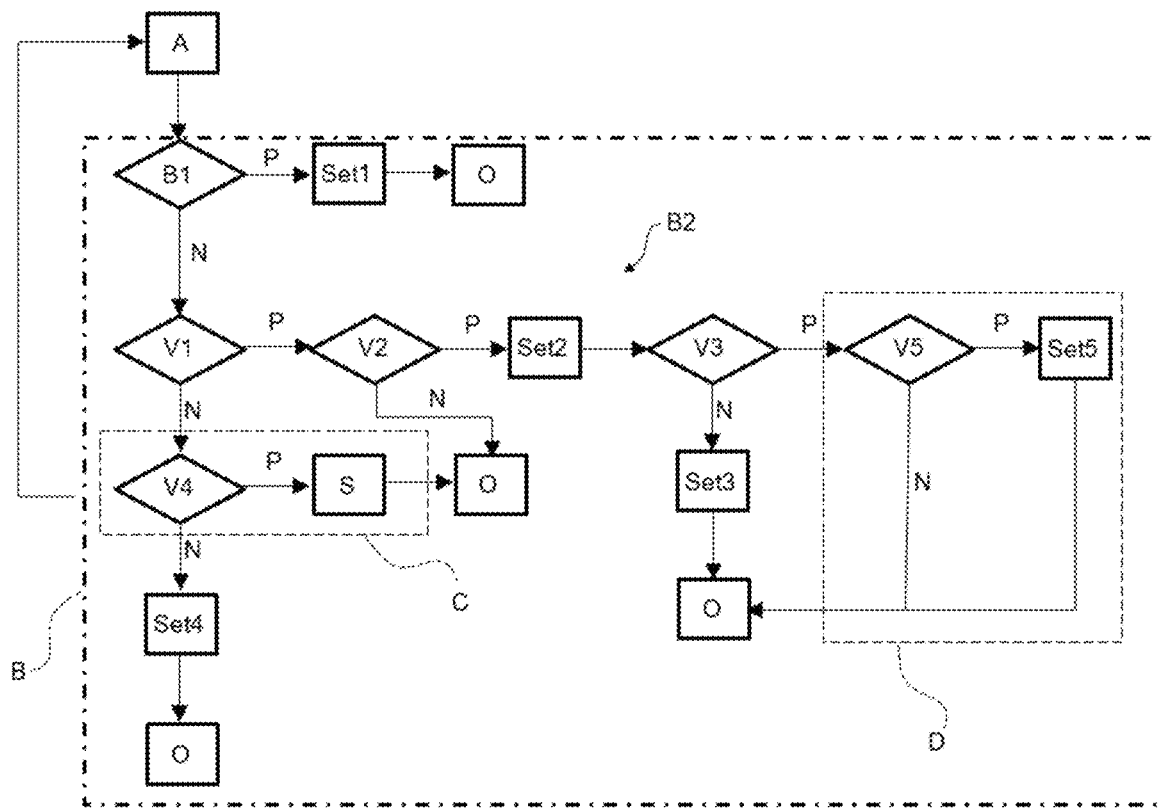
FIG. 4 is a schematic view of a further variant of an operating method of a refrigeration plant according to the invention.

With particular reference to the above-mentioned drawings, a refrigeration plant 10 according to the invention has:
    at least one evaporator assembly 11a, 11b, 11c;
    a compressor assembly 12 which, in operation, has a variable and adjustable operating regime Rcomp (t) to adapt the cooling power made available to that required by each evaporator assembly 11a, 11b, 11c;
    a condenser assembly 13;
    an expander assembly 14a, 14b, 14c;
    a control device 15 connected to the compressor assembly 12 for operating it;
    sensing means 16a, 16b, 16c designed to detect or derive an overheating temperature Tsh, $Tsh_i$ at an intake of the compressor assembly 12 and/or at the discharge, that is, downstream, of each evaporator assembly 11a, 11b, 11c.

Where more than one evaporator assembly 11a, 11b, 11c is provided, each can be identified with a natural number i, whereby the expression Tsh; means the overheating temperature at the discharge of the respective i-th evaporator assembly 11a, 11b, 11c.

The sensing means 16a, 16b, 16c are connected to the control device 15 to provide the latter with values of the overheating temperature Tsh, $Tsh_i$.

The control device 15 according to the invention is programmed to carry out an actuation method as described below.

The control device 15 may consist of a unitary device or may consist of a plurality of controllers distributed according to a predefined architecture according to the contingent implementation needs of the invention.

In particular, for example, a local controller may be provided for each refrigeration unit, that is, for each of the evaporator assemblies 11a, 11b, 11c.

Such local controllers may, as a whole, constitute the control device 15 and each may be connected to a corresponding one of the sensing means 16a, 16b, 16c, each of which may for example comprise a temperature sensor positioned downstream of the corresponding evaporator assembly 11a, 11b, 11c.

Similarly, each local controller may be simultaneously connected to a respective expander assembly 14a, 14b, 14c of the refrigeration unit of which it is a part.

The refrigeration plant 10 is preferably devoid of an oil separator at the discharge of the compressor assembly 12 and preferably entirely devoid of an oil separator.

The refrigeration plant 10 has expander assembly 14a, 14b, 14c which may comprise an expander member respectively indicated with references 14a, 14b and 14c, for each evaporator assembly 11a, 11b, 11c, connected to the control device 15 to be operated according to the optimization algorithm.

The expander member may be a valve of a type known per se and not further described.

The above-mentioned operating method, according to the invention, comprises operating according to a mode A and, whenever specific conditions occur that may cause a risk of insufficient lubrication for the compressor assembly 12, it pass to integrate a mode B, as described below in mode A.

In other words, the method is designed to prevent conditions in which the flow of refrigerant fluid which circulates through the refrigerating system 10 is such that it tends not to draw sufficient lubricating fluid to the compressor assembly and/or when the latter is in a working condition in which it tends to discharge more lubricating fluid than it receives by drawing the cooling fluid.

Such conditions could occur, for example, at the start of the refrigeration plant 10 or following a defrosting step of an evaporator assembly 11a, 11b, 11c or, in general, whenever there is a pull-down operating condition.

In other words, the refrigeration plant 10, under normal operating conditions, that is to say, when the above-mentioned situations do not occur, operates according to mode A in which an optimization algorithm, in a manner known per se, determines a target value Ropt for the operating regime Rcomp(t) of the compressor assembly 12 so as to obtain an optimization of operation of the refrigeration plant 10, for example by making available the cooling power gradually required over time by each evaporator assembly 11a, 11b, 11c for cooling a corresponding refrigeration unit.

Mode B includes the following sub-steps:
the following sub-steps are carried out in series:
a sub-step B1 that consists of a verification of whether the operating regime Rcomp(t) is less than a predefined safety value Mpd and, in case of a positive outcome P, perform an output operation O after making an initial setting Set1 that includes setting a value of an operating parameter RcompMax equal to said safety value Mpd;
a sub-step B2 which is performed if the verification of sub-step B1 has given a negative outcome N and which provides
a first verification V1 consisting of verifying whether the overheating temperature Tsh is greater than or equal to a threshold value Max and, in the event of a negative outcome N, performing a fourth setting Set4, which involves increasing the value of the operating parameter RcompMax, and, subsequently, performing said output operation O or,
in the case of a positive outcome P of said first verification V1, performing a second verification V2 comprising verifying whether the operating regime Rcomp (t) is greater than the predefined safety value Mpd and, in the case of a negative outcome N, performing said output operation O or
in case of positive outcome P of said second verification V2, making a second setting Set2 which provides for decreasing the value of said operating parameter RcompMax, then performing a third verification V3 which consists in verifying whether the value of said operating parameter RcompMax is greater than or equal to said safety value Mpd and, in the case of a positive outcome P, performing said output operation O or, in case of negative outcome N, perform said output operation O after performing a third setting Set3 which provides for setting the value of said operating parameter RcompMax equal to said safety value Mpd.

Said output operation O involves assigning a new value to the target value Ropt, equal to the value of the operating parameter RcompMax, if the latter is less than the target value Ropt itself, or maintaining the current value of the target value Ropt.

The output operation O therefore involves assigning to the target value Ropt the smaller value between the target value Ropt itself and the value of the operating parameter RcompMax.

Mode B can be iterated cyclically during mode A and overrides the latter in setting the target value Ropt.

It should be noted that when starting the system, in accordance with the execution of mode A the operating regime Rcomp(t), which will initially be zero (that is to say, Rcomp(0)=0), will tend towards the target value Ropt.

In any case, the method according to the invention provides, in a per se traditional manner, for limiting the operating regime Rcomp(t) to a maximum limit Rmax which is generally a value provided by the manufacturer of the compressor assembly, beyond which the compressor would operate in critical conditions regardless of its lubrication state.

The safety value Mpd is, at least initially, preset to a non-zero value, that is, 0<Mpd<Rmax.

At startup, therefore, the first verification B1 is certainly positive and the value of the operating parameter RcompMax is set equal to the safety value Mpd according to the first setting Set1.

According to the invention, therefore, the standard operating mode A of the refrigeration plant 10 is free to adjust the operating regime Rcomp(t) according to the predefined thermodynamic optimization algorithm of the refrigeration plant 10 only if the operating conditions of the system itself do not determine that the first verification V1 has a positive outcome. In other words, mode B is cyclically carried out during or in succession to mode A so that the operation of the refrigeration plant 10 is always monitored and conditions in which insufficient critical lubrication of the compressor assembly can occur are prevented, especially if the refrigeration plant is not provided with a refrigerant-lubricant separator.

Still in other words, mode A, if mode B does not operate, autonomously sets the target value Ropt, which is the operating regime value Rcomp(t) of the compressor assembly 12, so as the operating regime value Rcomp(t) tends towards the target value Ropt or, as is known in jargon, "chases" the target value Ropt.

Otherwise, when mode B is operating, the operating regime Rcomp(t) is in fact limited to a value of the operating parameter RcompMax if the overheating temperature Tsh is greater than or equal to a Max threshold value.

In fact, in the execution of the method according to the invention the value of the operating parameter RcompMax tends towards the safety value Mpd and is normally comprised between the safety value Mpd and the maximum limit Rmax.

In such a way, the compressor assembly 12 is prevented from operating at an operating regime Rcomp(t) where the following conditions occurs simultaneously:
- at the intake, thermo-fluid dynamic conditions of the refrigerant fluid such that the latter causes a poor drawing of refrigerant fluid in the compressor, and
- an operating regime Rcomp(t) such as to determine an expulsion of lubricating fluid, drawn by the refrigerant fluid pumped by the compressor, which is excessive with respect to the quantity of lubricating fluid fed to the compressor assembly 12 itself.

For example, the thermodynamic optimization algorithm may provide for adjusting the operating regime Rcomp(t) to optimize, over time, the reaching of a target or set-point temperature by an ambient temperature Ta detected in each room with which each respective evaporator assembly 11a, 11b, 11c is in thermal communication.

In other words, in the case of an application in which each evaporator assembly 11a, 11b, 11c is intended to cool each unit intended to contain products to be cooled, the thermodynamic optimization algorithm can provide for adjusting the operating regime Rcomp(t) to obtain the fastest possible cooling of each unit and/or of the products it is intended to contain.

In general, according to the invention, mode B overrides, in determining the target value Ropt, mode A, interrupting the normal management of the operating regime Rcomp(t) of the compressor provided by the optimization algorithm, limiting the operating regime Rcomp(t) to prevent damage to the compressor assembly 12 that could arise as a result of an actuation of the same to an excessive operating regime with respect to the contingent lubrication, as already mentioned and more widely discussed below.

This method of operation and the refrigeration plant 10 therefore allows damage or excessive stresses to the compressor assembly to be avoided in "pull down" conditions, as occurs at the first start-up or following a series of defrosting operations of the evaporator assemblies 11a, 11b, 11c, that is to say, in conditions in which the refrigeration plant is required, by the optimization algorithm, to absorb the maximum quantity of heat possible to the evaporator assemblies 11a, 11b, 11c starting from a condition in which the refrigeration fluid has a poor capacity of drawing the lubricant destined for the compressor assembly 12.

The second setting Set2 may provide for a reduction of a predefined reduction value Decr so that, in formula, the second setting Set2 may execute the setting: RcompMax=RcompMax-Decr, i.e. the setting according to which the value of the operating parameter RcompMax is lowered of a predefined reduction value Decr.

According to the invention, the terms "lubricant" and "oil" are used in a substantially interchangeable manner, with them referring to a substance suitable for lubricating the moving parts of the compressor assembly 12 reducing the dynamic friction between them and between them and fixed parts.

It should be noted that the term "limiting" in this text may mean:
- reducing the operating regime Rcomp(t) of the compressor assembly to a value equal to a specific value, such as, for example, the safety value Mpd, or
- reducing the operating regime Rcomp(t) of the compressor assembly to any value provided that it does not exceed a specific value, such as, for example, the safety value Mpd.

The operating method may also comprise a step C which is carried out only if the first verification V1 carried out in mode B has a negative outcome N and which provides for a fourth verification V4 which provides for verifying whether a time derivative Tsh' of the overheating temperature Tsh, calculated with respect to the overheating temperature detection instant Tsh, has a value equal to or greater than an upper limit value Max'.

According to step C, before performing the output operation O, a safety operation S can be performed which prevents a change in the value of the operating parameter RcompMax of the compressor assembly 12 if the fourth verification V4 has a positive outcome P so as to prevent an acceleration of the compressor assembly 12, that is to say, an increase in the operating regime Rcomp(t), if the latter has reached the value of the operating parameter RcompMax.

Step C may provide that the fourth verification V4 is carried out before the fourth setting Set4 which is only carried out if the fourth verification V4 has a negative outcome N.

Step C may be considered part of step B or may be considered as a step autonomous from step B.

In the implementation solutions of the present method that integrate step C, mode A autonomously sets the optimal value Ropt if the conditions described above do not occur in which mode B sets the optimal value Ropt, the fourth verification V4 of step C having a negative outcome N.

In other words, according to step C the value of the operating parameter RcompMax cannot be varied by the control device 15 if the superheating temperature Tsh increases with a time derivative greater than an upper limit value Max' or, possibly, if it decreases with a time derivative less than a lower limit value Min' (which is negative).

According to an alternative embodiment of the invention, Step C, which is carried out only if the first verification V1 has a negative outcome N, may provide that the fourth verification V4 predicts whether a time derivative Tsh' of the superheating temperature Tsh has a value equal to or less than a lower limit value Min'.

In this case, step C performs, before performing the output operation O, the safety operation S which prevents a change in the value of the operating parameter RcompMax of the compressor assembly 12 if the fourth verification V4 has a positive outcome P.

In other words, according to an embodiment of the invention, step C may perform the safety operation S, before the output operation O, if the verification V4 has a positive outcome as the time derivative Tsh' of the superheating temperature Tsh has a value equal to or lower than a lower limit value Min' or equal to or greater than an upper limit value Max'.

In other words, if the value of the time derivative Tsh' of the superheating temperature Tsh is equal to or greater than the upper limit value Max' or if this value is less than or equal to the lower limit value Min', step C may comprise controlling the compressor assembly 12 such that the operating parameter RcompMax does not vary.

According to the example shown in the accompanying drawings, the refrigeration plant 10 may comprise a plurality of evaporator assemblies, that is to say, it may be a multi-evaporator system; therefore, what has been described so far for simplicity of description with reference to a saturation temperature Tsh and/or to a time derivative Tsh' applies equally, in a similar manner, with reference to saturation temperature $Tsh_i$ and to the time derivative $Tsh_i$' referring to each evaporator assembly 11a, 11b, 11c which may be referred to with an integer i.

For example, according to FIG. 1 in which three evaporator assemblies 11a, 11b, 11c are shown, the saturation temperature $Tsh_1$ and the time derivative $Tsh_1$' may be referred to a first 11a of the evaporator assemblies 11a, 11b, 11c, the saturation temperature $Tsh_2$ and the time derivative $Tsh_2$' may be referred to a second 11b of the evaporator assemblies 11a, 11b, 11c and the saturation temperature $Tsh_3$ and the time derivative $Tsh_3$' may be referred to the third 11c of the evaporator assemblies 11a, 11b, 11c where, therefore, i may adopt the value 1, 2 or 3 to indicate the respective evaporator assemblies 11a, 11b, 11c.

The sensing means 16a, 16b, 16c can be configured to detect or derive an overheating temperature $Tsh_i$ downstream of each of the evaporator assemblies 11a, 11b, 11c where i is, in fact, an integer identifying each evaporator assembly 11a, 11b, 11c.

In this case, mode B verifies, in extreme synthesis, for each of the evaporator assemblies 11a, 11b, 11c whether the superheating temperature $Tsh_i$ downstream of the latter is equal to or greater than the threshold value Max.

This mode B therefore comprises limiting the operating regime Rcomp(t) of the compressor assembly 12 to the value of the operating parameter RcompMax if this verification is positive P even for only one of the i evaporator assemblies 11a, 11b, 11c.

In detail, mode B may comprise carrying out the first verification V1 for each of i evaporator assemblies 11a, 11b, 11c to verify whether one of the overheating temperatures $Tsh_i$ downstream of the latter is equal to or greater than the threshold value Max.

Mode B may comprise limiting the operating regime Rcomp(t) to the value of the operating parameter RcompMax if the first verification V1 is positive also for only one of said i evaporator assemblies 11a, 11b, 11c, that is to say, if even only one of the temperatures $Tsh_i$ downstream of the latter is equal to or greater than the threshold value Max.

Similarly, Step C, may comprise verifying for each i-th of the evaporator assemblies 11a, 11b, 11c whether the time derivative $Tsh_i$' of one of the superheating temperatures $Tsh_i$ has a value equal to or greater than the upper limit value Max'.

In this case, in detail, the fourth verification V4 may comprise verifying for each i-th of the evaporator assemblies 11a, 11b, 11c whether a time derivative $Tsh_i$' of one of the superheating temperatures $Tsh_i$ has a value equal to or less than the lower limit value Min'.

Step C may provide for carrying out, before performing the output operation O, the safety operation S, which prevents a change in the value of the operating parameter RcompMax of the compressor assembly 12, if the fourth verification V4 has a positive outcome P even for only one of the evaporator assemblies (11a, 11b, 11c), that is, if the time derivative $Tsh_i$' of even only one of the superheating temperatures $Tsh_i$ has a value equal to or lower than the lower limit value Min'.

Or, if the fourth verification V4 has a negative outcome N, step C may comprise making a fourth setting Set4, which comprises increasing the value of the operating parameter RcompMax, before performing the output operation O.

The fourth setting Set4 may provide for an increase of a predefined increase value Incr so that, in formula, the fourth setting Set4 may execute the setting: RcompMax=RcompMax+Incr; i.e. the setting according to which the value of the operating parameter RcompMax is increased of a predefined increase value Incr.

Step C may therefore prevent a change in the value of the operating parameter RcompMax of the compressor assembly 12 if the fourth verification V4 has a positive outcome P even for only one of the evaporator assemblies 11a, 11b, 11c.

In other words, as above described in a more general way, mode B and step C, where provided, take precedence over the performance of mode A, allowing the operating regime Rcomp(t) of the compressor assembly 12 to be reduced to the safety value Mpd if the overheating temperature Tsh, $Tsh_i$ is equal to or greater than the threshold value Max and not to vary the value of the operating parameter RcompMax of the compressor assembly 12 if the overheating temperature Tsh, $Tsh_i$ tends to rise too fast, or tends to fall too fast, that is, if the time derivative Tsh', $Tsh_i$' thereof is equal to or greater than the upper limit value Max' or is equal to or lower than the lower limit value Min'.

The threshold value Max and the upper limit value Max' can be set empirically.

In other words, for example, the threshold value Max can be defined by measuring or deriving the value of the superheating temperature Tsh in the refrigeration plant 10, during its operation, in a condition in which a substantial absence of return of lubricant to the compressor assembly 12 is measured or detected.

Once the threshold value Max has been defined and an integral time Ti of the control of the expander member of the expander assembly 14a, 14b, 14c has been measured, it is possible to obtain the upper and lower limit values Max' and Min', where the integral time Ti is the time in which the overheating temperature Tsh, $Tsh_i$ has reached the threshold value Max starting from the set-point temperature, which is set according to the predefined thermodynamic optimization algorithm.

This set-point temperature can be a minimum value of the superheating temperature $Tsh_i$ defined for the evaporator assemblies 11a, 11b and 11c which can be set up, for example by programming the control device 15, so as to prevent liquid refrigerant fluid from reaching the compressor assembly 12. That is to say, such a set-point temperature may be an overheating temperature $Tsh_i$ at the outlet of the evaporator assemblies 11a, 11b, 11c dropping beyond which the refrigerant fluid could reach the compressor assembly 12 partially in the liquid phase, tending to damage it.

In particular, the upper limit value Max' and lower limit value Min' will be given, respectively, by the positive value and by the negative value adopted from the ratio between
  the increase of the overheating temperature Tsh, $Tsh_i$ from the set-point temperature, for example as set above by programming the control device 15, to the threshold value Max, and
  the integral time Ti.

Alternatively to the empirical determination of the threshold value Max and the upper limit value Max' and lower limit value Min' they can, for example, be calculated on the basis of the nominal contingent parameters of the specific refrigeration plant 10 implemented according to the invention.

In this case, it is possible to refer to the parameter vacuum degree α of the evaporator assembly 11a, 11b, 11c, where the vacuum degree α means a quantity indicating a volume fraction occupied by the gaseous phase of refrigerant fluid within the control volume of the evaporator assembly 11a, 11b, 11c, that is, for example, of the control volume of a finned battery of tubes that can form each of the evaporator assemblies 11a, 11b, 11c.

It can be assumed that if the vacuum degree α exceeds the value of 90% it means that in the control volume the gaseous phase occupies 90% of the volume and the liquid phase, that is, the liquid refrigerant fluid and the lubricant, occupy only the remaining 10%.

During the execution of mode A, in which the refrigeration plant is regulated according to the thermodynamic optimization algorithm, the expansion assembly 14a, 14b, 14c is operated so as to regulate the superheating temperature Tsh, $Tsh_i$, so as to bring the latter to the value of the set-point, superheating temperature, defined for each i-th of the evaporator assemblies 11a, 11b, 11c; it is therefore possible that the superheating temperature Tsh, $Tsh_i$ rises to levels such as to increase the extension of a superheating region of the i-th of the evaporator assemblies 11a, 11b, 11c.

The "superheating region" means a zone of the i-th of the evaporator assemblies 11a, 11b, 11c in which the liquids have the minimum viscosity and therefore the minimum propensity to be drawn by the gaseous phase of the refrigerant fluid where, on the other hand, the liquid phase is usually the one that tends to draw it or to mix with it, so as to lead it to the dry-out point, beyond which the gaseous fraction of the refrigerant liquid, almost completely purified of the evaporated liquid phase, still draws the lubricant towards the return pipe until the intake of the compressor assembly 12.

Increasing the superheating temperature Tsh, $Tsh_i$ reduces the area in which the lubricant is more easily drawn by the liquid and this causes an increased retaining of the lubricant inside the evaporator assembly 12 or the intake line thereof.

For the calculation of the superheating temperature Tsh, $Tsh_i$, the saturated evaporation temperature Tev and the intake temperature Tasp are relevant and these quantities influence: flow rate q, density ρ, speed v, viscosity μ, vapour quality x and the vacuum degree α of the refrigerant.

It is therefore possible to set the threshold value Max and the upper limit value Max', and possibly also the lower limit value Min', depending on the type of evaporator: single or multi-circuit, that is, with number of circuits n.

The threshold value Max can then be calculated as the nominal value reached by the superheating temperature Tsh, $Tsh_i$ corresponding to a preselected vacuum degree value α at the evaporator assembly, for example at a vacuum degree α=90% to which a length L≤80% of the total length of each circuit of the relative evaporator assembly 11a, 11b, 11c would correspond.

Estimated, therefore, that at the chosen vacuum degree value α, for example α=90%, a refrigerant retention is established in the evaporator assembly 11a, 11b, 11c such that the compressor assembly 12 remains without adequate lubrication, it is possible to assume the threshold value Max equal to the value of the overheating temperature Tsh, $Tsh_i$ assumed in this condition, that is:

Tshi=Max solving the following equation:

$$\begin{cases} \alpha = f(p, n, Tev, Tasp, Tsh, z) \\ \alpha = 90\% \\ z = 80\% \end{cases}$$

Where two examples of methods for calculating the vacuum degree α are given below:

Hughmark method (1962) of calculating the vacuum degree α s:

$$\alpha = K_H \beta$$

$$Z = \left[\frac{DG}{\mu_f + \alpha(\mu_g - \mu_f)}\right]^{\frac{1}{6}} \left[\frac{1}{gD}\left(\frac{Gx}{\rho_g \beta(1-\beta)}\right)^2\right]^{\frac{1}{8}}$$

Where

| Z  | 1.3   | 1.5   | 2.0   | 3.0  | 4.0   | 5.0   | 6.0  | 8.0   | 10.0 | 15.0  | 20.0 | 40.0 | 70.0 | 130.0 |
|----|-------|-------|-------|------|-------|-------|------|-------|------|-------|------|------|------|-------|
| Kg | 0.185 | 0.225 | 0.325 | 0.49 | 0.605 | 0.675 | 0.72 | 0.767 | 0.78 | 0.808 | 0.83 | 0.88 | 0.93 | 0.98  |

The Method of Premoli et al. (1971) calculating the vacuum degree α:

$$\alpha = \frac{1}{x_r * \rho_r^{-1} * S}$$

$$S = 1 + aRe_L^{-0.19}(\rho_r)^{0.22}\left[\frac{y}{1 + byWe_L Re_L^{-0.53}(\rho_r)^{-0.08}} - byWe_L Re_L^{-0.53}(\rho_r)^{-0.08}\right]^{0.5}$$

$a = 1.578$, $b = 0.0273$, $$y = \frac{\beta}{1-\beta},$$

$$We_L = \frac{G^2 D}{\sigma \rho_f g}$$

Where the parameters indicated have the meaning expressed in the following table of nomenclatures and units of measurement.

| | | |
|---|---|---|
| $c_p$ | specific heat | (J/kg · K) |
| D | internal tube diameter | (m) |
| G | mass flux | (kg/m²s) |
| h | enthalpy | (J/kg) |
| L | length | (m) |
| m* | mass flow rate | (kg/s) |
| M | charge | (kg) |
| P | refrigerant pressure | (Pa) |
| T | temperature | (K) |
| U | average heat transfer Coefficient | (W/m² · K) |
| V | heat exchanger internal volume | (m³) |
| x | vapor quality | (—) |
| $x_r$ | (1 − x)/x | (—) |
| α | Void fraction | (—) |
| β | $[1 + x_r \rho_r]^{-1}$ | (—) |
| $\mu_r$ | $\mu_f/\mu_g$ | (—) |

| | | |
|---|---|---|
| μ | Dynamic Viscosity | (Pa · s) |
| ρ | Density | (kg/m³) |
| ρ_r | ρ_f/ρ_g | (−) |
| τ | Time | (s) |
| | Subscript | |
| 2ph | two phase | |
| f | saturated liquid | |
| fg | 2-phase | |
| g | saturated vapor | |
| H.X. | heat exchanger | |
| in | inlet | |
| liq | liquid | |
| out | outlet | |
| ref | refrigerant | |
| sat | saturation | |
| vap | vapor | |

For example, it is possible to obtain that in a refrigeration plant 10 using carbon dioxide as a cooling fluid with evaporator assemblies with 1 circuit, there is a threshold value Max=15K beyond which the condition α=90% occurs at evaporator circuit length=80% to verify oil retention;

that in a refrigeration plant 10 using carbon dioxide as a cooling fluid with evaporator assemblies with 2 circuits, there is a threshold value Max=10K beyond which the condition α=90% occurs at evaporator circuit length=80% to verify oil retention. The upper limit value Max' and lower limit value Min' can be calculated as deriving from the integral time Ti of the expander assembly 14a, 14b and 14c and from the difference between the threshold value Max and the set-point temperature:

$$\text{Max}' = +\left|\frac{\text{Max} - \text{setpoint } Tsh}{Ti}\right| \left[\frac{K}{s}\right]$$

$$\text{Min}' = -\left|\frac{\text{Max} - \text{setpoint } Tsh}{Ti}\right| \left[\frac{K}{s}\right]$$

In other words, if the speed with which the superheating temperature Tsh, $Tsh_i$ rises is greater than that which makes the contribution integral to bringing the superheating temperature Tsh, $Tsh_i$ to the threshold value Max from the set-point temperature, then it is assumed that there is a possibility that the compressor assembly 12 accelerates and causes an oil retention condition, whereby according to the present method such acceleration is avoided by delaying the execution of mode A, that is, the return of the control of the operating regime Rcomp(t) of the compressor assembly 12 based on the set-point temperature, in the integral time Ti parameterized by the control device 15.

In this way, the parameters are flexible and specific to the specific refrigeration plant in which the present method is carried out to protect the compressor assembly 12 from the risk of a poor lubrication.

The method according to the invention may also comprise a step D which is carried out if the third verification V3 has a positive outcome P and which provides, before executing the output operation O, a fifth verification V5.

The fifth verification V5 may involve verifying whether the operating regime Rcomp(t) is less than the value of the operating parameter RcompMax.

In the event of a positive outcome P of the fifth verification V5, step D may envisage making a setting Set5 which envisages setting the value of the operating parameter RcompMax equal to the current value of the operating regime Rcomp(t), otherwise it envisages leaving the value of said operating parameter RcompMax unchanged.

In other words, in the case of a positive outcome P of the fifth verification V5, there is a setting Set5 of the value of the operating parameter RcompMax equal to the current value of the operating regime Rcomp(t), the execution of the output operation O.

The method according to the invention may also provide for inhibiting the performance of mode B following a setting by an operator; in this way the function of limiting the operating regime Rcomp(t) of mode B, according to the operating method according to the invention, may be selectively activated or deactivated.

In a traditional manner, the refrigeration plant 10 may comprise a separator unit 17 designed to separate liquid refrigerant fluid from gaseous refrigerant fluid, positioned hydraulically between the condenser assembly 13 and the expander assembly 14a, 14b, 14c and connected upstream of the compressor assembly 12 by means of a flash gas valve 18 which adopts an open configuration if necessary discharging gaseous refrigerant fluid upstream of the compressor assembly 12, if necessary, in a traditional manner.

The refrigeration plant 10 may also be provided with a high pressure valve 19 connected to the control device 15 to be operated by the latter according to the optimization algorithm, in a manner known per se.

The refrigeration plant 10 preferably uses carbon dioxide as a cooling fluid and can operate according to a transcritical operating cycle.

It may be understood, therefore, how a refrigeration plant 10, for example of a multi-evaporator type, and the operating method thereof, according to the invention, allow the task and set aims to be achieved by allowing the use of an oil separator to be avoided by limiting and in general controlling the operating regime of the compressor assembly 12 preventing it from being operated under conditions of potential excessive mechanical and/or thermal stress, even if the refrigeration plant is without a refrigerant-lubricant separator, especially downstream of the compressor assembly.

The implementation of the invention therefore allows the costs of manufacture of a refrigeration plant made in accordance with the appended claims to be limited; in fact it allows the use of one or more refrigerant-lubricant separators to be avoided.

This refrigeration plant can also be more compact and, in general, less sensitive to malfunctions and may require less maintenance for the same performance and operating conditions, compared to traditional solutions, particularly since it may be free of oil separators.

A multi-evaporator refrigeration plant and an operating method thereof according to the invention allow overheating conditions of the compressor to be prevented or, in any case, mechanical stress of the latter, in particular during pull down phases.

In addition, a multi-evaporator refrigeration plant and an operating method thereof, according to the invention, allows to avoid the use of lubricant/refrigerant separators while ensuring adequate safety of operation of the compressor, a long service life and without determining significant increases in maintenance of the system under the same workloads.

The invention thus conceived is susceptible to numerous modifications and variations, all of which fall within the scope of protection of the attached claims.

Further, all details may be replaced by other technically equivalent elements.

The invention claimed is:

1. An operating method of a refrigeration plant, wherein said refrigeration plant includes in sequence:
   at least one evaporator assembly;
   a compressor assembly which, in operation, has a variable and adjustable operating regime Rcomp(t);
   a condenser assembly;
   an expander assembly;
   a control device connected to said compressor assembly to operate it;
   sensing means apt to detect or derive an overheating temperature Tsh at an intake of said compressor assembly and/or downstream of each of said at least one evaporator assembly, connected to said control device;
   wherein said method involves operating said compressor assembly so as to bring its operating regime Rcomp(t) to a target value Ropt; said method comprising:
   a mode A, of standard operation of said refrigeration plant, within which said target value Ropt is defined by an optimization algorithm of said refrigeration plant;
   a mode B, of preventing deficient lubrication conditions of the compressor assembly, within which the following sub-steps are carried out serially:
   a sub-step B1 that consists of a verification of whether the operating regime Rcomp(t) is less than a predefined safety value Mpd and, in case of a positive outcome, performing an output operation O after making an initial setting Set1 that includes setting a value of an operating parameter RcompMax equal to said safety value Mpd;
   a sub-step B2 which is performed if the verification of sub-step B1 has given a negative outcome and which provides
   a first verification V1 consisting of verifying whether the overheating temperature Tsh is greater than or equal to a threshold value Max, and, in case of negative outcome, making a fourth setting Set4, which involves increasing the value of the operating parameter RcompMax, and, subsequently, performing said output operation O or,
   in the case of a positive outcome of said first verification V1, performing a second verification V2 comprising verifying whether the operating regime Rcomp (t) is greater than the predefined safety value Mpd and, in the case of a negative outcome, performing said output operation O or
   in case of a positive outcome of said second verification V2, making a second setting Set2 which involves decreasing the value of said operating parameter RcompMax, then performing a third verification V3 which consists of verifying whether the value of said operating parameter RcompMax is greater than or equal to said safety value Mpd and, in case of a positive outcome, performing said output operation O or, in case of a negative outcome, performing said output operation O after making a third setting Set3 which involves setting the value of said operating parameter RcompMax equal to said safety value Mpd;
   wherein said output operation O involves assigning to said target value Ropt a new value, equal to the value of said operating parameter RcompMax, if the latter is less than said target value Ropt itself;
   wherein said mode B is iterated cyclically during the mode A or performed concurrently with the mode A and overrides the latter in the setting of said target value Ropt.

2. The operating method according to claim 1 wherein said refrigeration plant comprises a number i of evaporator assemblies;
   wherein said sensing means are configured to detect or derive an overheating temperature $Tsh_i$ downstream of each of said i evaporator assemblies; said mode B providing for conducting said first verification V1 for each of said i evaporator assemblies to verify whether the overheating temperatures $Tsh_i$ downstream of the latter are equal to or greater than said threshold value Max; said mode B by providing for limiting said operating regime Rcomp(t) to a safety value Mpd if said first verification V1 is also positive for only one of said i evaporator assemblies.

3. The operating method according to claim 2 comprising a step C which is carried out exclusively if said first verification V1 has a negative outcome, and comprising a fourth verification V4 which comprises verifying whether a time derivative Tsh' of said overheating temperature Tsh has a value equal to or greater than an upper limit value Max'; said step C providing for performing, prior to performing said output operation O, a safety operation S providing for preventing a change in the value of the operating parameter RcompMax of said compressor assembly if said fourth verification V4 has a positive outcome; wherein said fourth verification V4 is performed prior to said fourth setting Set4, which is performed only if said fourth verification V4 has a negative outcome.

4. The operating method according to claim 3 wherein said refrigeration plant comprises a number i of evaporator assemblies; wherein said sensing means are configured to detect or derive an overheating temperature $Tsh_i$ downstream of each of said i evaporator assemblies; said mode B providing for conducting said first verification V1 for each of said i evaporator assemblies to verify whether the overheating temperatures $Tsh_i$ downstream of the latter are equal to or greater than said threshold value Max; said mode B by providing for limiting said operating regime Rcomp(t) to a safety value Mpd if said first verification V1 is also positive for only one of said i evaporator assemblies; wherein said step C comprises verifying for each i-th of said evaporator assemblies whether a time derivative Tshi' of said overheating temperature $Tsh_i$ has a value equal to or greater than said upper limit value Max'; said step C involves performing a safety operation S, prior to performing said output operation O, which involves preventing a change in the value of the operating parameter RcompMax of said compressor assembly if said fourth verification V4 has a positive outcome even for only one of said evaporator assemblies; wherein said fourth verification V4 is performed prior to said fourth setting Set4, which is performed only if said fourth verification V4 has a negative outcome.

5. The operating method according to claim 4 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

6. The operating method according to claim 3 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

7. The operating method according to claim 2 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

8. The operating method according to claim 1 comprising a step C which is carried out exclusively if said first verification V1 has a negative outcome, and comprising a fourth verification V4 which comprises verifying whether a time derivative Tsh' of said overheating temperature Tsh has a value equal to or greater than an upper limit value Max'; said step C providing for performing, prior to performing said output operation O, a safety operation S providing for preventing a change in the value of the operating parameter RcompMax of said compressor assembly if said fourth verification V4 has a positive outcome; wherein said fourth verification V4 is performed prior to said fourth setting Set4, which is performed only if said fourth verification V4 has a negative outcome.

9. The operating method according to claim 8 wherein said refrigeration plant comprises a number i of evaporator assemblies;
wherein said sensing means are configured to detect or derive an overheating temperature Tshi downstream of each of said i evaporator assemblies;
said mode B providing for conducting said first verification V1 for each of said i evaporator assemblies to verify whether the overheating temperatures $Tsh_i$ downstream of the latter are equal to or greater than said threshold value Max; said mode B by providing for limiting said operating regime Rcomp(t) to a safety value Mpd if said first verification V1 is also positive for only one of said i evaporator assemblies;
wherein said step C comprises verifying for each i-th of said evaporator assemblies whether a time derivative Tsh' of said overheating temperature Tshi' has a value equal to or greater than said upper limit value Max'; said step C involves performing a safety operation S, prior to performing said output operation O, which involves preventing a change in the value of the operating parameter RcompMax of said compressor assembly if said fourth verification V4 has a positive outcome even for only one of said evaporator assemblies; wherein said fourth verification V4 is performed prior to said fourth setting Set4, which is performed only if said fourth verification V4 has a negative outcome.

10. The operating method according to claim 9 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

11. The operating method according to claim 8 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

12. The operating method according to claim 1 comprising a step C which is performed only if said first verification V1 has a negative outcome and comprising performing a fourth verification V4 comprising verifying whether a time derivative Tsh' of said overheating temperature Tsh has a value equal to or less than a lower limit value Min'; said step C providing for carrying out a safety operation S, before carrying out said output operation O, which prevents a change in the value of the operating parameter RcompMax of said compressor assembly if said fourth verification V4 has a positive outcome; wherein said fourth verification V4 is carried out before said fourth setting Set4, which is carried out only if said fourth verification V4 has a negative outcome.

13. The operating method according to claim 12 wherein said refrigeration plant comprises a number i of evaporator assemblies; wherein said sensing means are configured to detect or derive an overheating temperature $Tsh_i$ downstream of each of said i evaporator assemblies; said mode B providing for conducting said first verification V1 for each of said i evaporator assemblies to verify whether the overheating temperatures $Tsh_i$ downstream of the latter are equal to or greater than said threshold value Max; said mode B by providing for limiting said operating regime Rcomp(t) to a safety value Mpd if said first verification V1 is also positive for only one of said i evaporator assemblies; wherein said fourth verification V4 which provides for verifying for each i-th of said evaporator assemblies whether a time derivative $Tsh_i$' of said overheating temperature $Tsh_i$ has a value equal to or less than said lower limit value Min'; said step C providing for performing a safety operation S, prior to performing said output operation O, which prevents a change in the value of the operating parameter RcompMax of said compressor assembly if said fourth verification V4 has a positive outcome even for only one of said evaporator assemblies; wherein said fourth verification V4 is performed prior to said fourth setting Set4, which is performed only if said fourth verification V4 has a negative outcome.

14. The operating method according to claim 13 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

15. The operating method according to claim 12 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

16. The operating method according to claim 1 comprising a step D that is carried out if said third verification V3 has positive outcome and that provides, prior to performing said output operation O, a fifth verification V5 that provides verifying whether the operating regime Rcomp(t) is less than the value of said operating parameter RcompMax and, in the case of a positive outcome, making a setting Set5 that involves setting the value of said operating parameter RcompMax equal to the current value of the operating regime Rcomp(t).

17. A refrigeration plant that comprises:
at least one evaporator assembly;
a compressor assembly which, in operation, has a variable and adjustable operating regime Rcomp;
a condenser assembly;
an expander assembly;
a control device connected to said compressor assembly to operate it;
sensing means apt to detect or derive an overheating temperature Tsh at an intake of said compressor assembly, connected to said control device to be controlled by the latter;
wherein said control device is programmed to carry out a method according to claim 1.

18. The refrigeration plant according to claim 17 that lacks an oil separator at the discharge of said compressor assembly.

19. The refrigeration plant according to claim 17 that lacks an oil separator.

* * * * *